United States Patent
Darling, Jr. et al.

(10) Patent No.: US 9,710,481 B1
(45) Date of Patent: Jul. 18, 2017

(54) VIRTUAL APPLICATION INSTALLATION AND STORAGE FOR DIGITAL DISTRIBUTION PLATFORMS

(71) Applicant: Amazon Technologies, Inc., Seattle, WA (US)

(72) Inventors: Donald John Darling, Jr., Sunnyvale, CA (US); Douglas Sim Dietrich, Los Gatos, CA (US); Jaee Patwardhan, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 14/498,708

(22) Filed: Sep. 26, 2014

(51) Int. Cl.
G06F 9/445 (2006.01)
G06F 17/30 (2006.01)
G06F 12/02 (2006.01)

(52) U.S. Cl.
CPC .... *G06F 17/30218* (2013.01); *G06F 12/0246* (2013.01); *G06F 2212/7202* (2013.01)

(58) Field of Classification Search
None
See application file for complete search history.

(56) References Cited

U.S. PATENT DOCUMENTS

| | | | |
|---|---|---|---|
| 8,863,116 B1* | 10/2014 | McCarten | G06F 9/445 709/203 |
| 2003/0004882 A1* | 1/2003 | Holler | G06F 8/65 705/51 |
| 2005/0193139 A1* | 9/2005 | Vinson | G06F 9/445 709/231 |

* cited by examiner

*Primary Examiner* — H S Sough
*Assistant Examiner* — Timothy Duncan
(74) *Attorney, Agent, or Firm* — Lowenstein Sandler LLP

(57) ABSTRACT

A virtual installation module running on a user device determines that at least one application file chunk is to be stored in a memory of the user device prior to being executed, wherein the application file chunk includes a subset of the data of the application and is stored on a remote storage device that correspond to an application to be executed by the processing device. The virtual installation module determines when a request to execute the application on the user device will be received and stores the at least one application file chunk from the remote storage device in the memory of the user device based at least in part on when the at least one application file chunk will be utilized during execution of the application.

18 Claims, 10 Drawing Sheets

VIRTUAL APPLICATION INSTALLATION AND STORAGE FOR DIGITAL DISTRIBUTION PLATFORMS

BACKGROUND

A large and growing population of users enjoys entertainment through the consumption of media items, including electronic media, such as electronic books (also referred to herein as ebooks), electronic newspapers, electronic magazines, digital audio and digital video. Users employ various electronic devices to consume such media items. Among these electronic devices are electronic book readers, cellular telephones, smartphones, personal digital assistants (PDAs), portable media players, tablet computers, netbooks, desktop computers, notebook computers, and the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
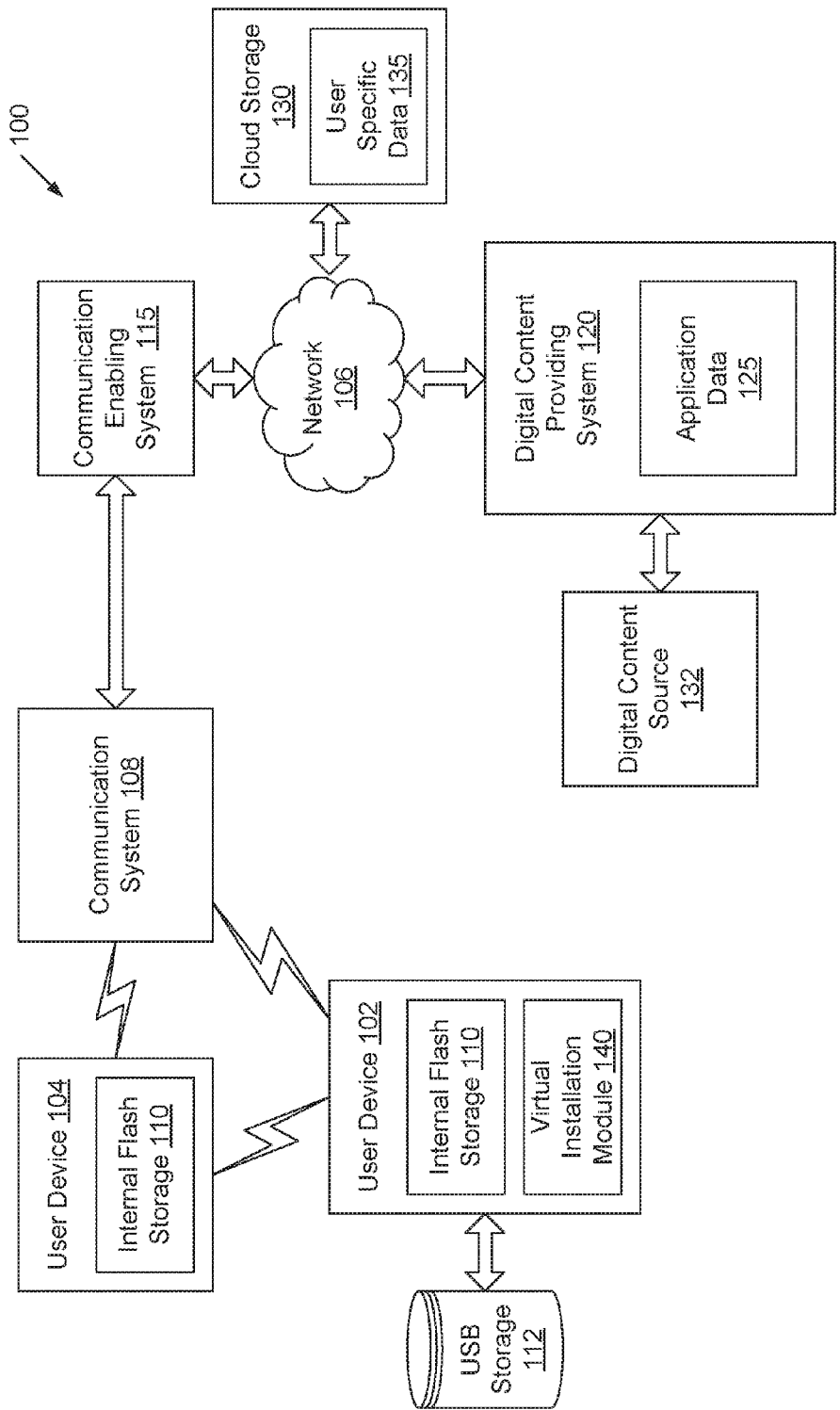
FIG. 1 is a block diagram of an exemplary network architecture, in which embodiments of the present invention may operate.

Embodiments are described for virtual application installation and storage for digital distribution platforms. The amount of flash storage installed on modern devices can significantly impact manufacturing costs and retail pricing. If manufacturers can reduce the amount of flash storage on a device without degrading the customer experience, they may gain a competitive edge in pricing and value. Many modern devices allow storage of applications and application data (e.g., videos, photos, contacts, etc.) in network accessible storage (e.g., "the cloud").

Existing solutions, however, are not truly expanding the storage capabilities of a device. Rather, they only provide a way to share application data between multiple devices, and to externally preserve applications and other information that cannot currently fit into the internal flash storage of the device. Segregation of applications and data between the device and the cloud can be managed by the user of the device. Although some devices support the access of pictures, videos, music or other data directly from cloud storage, these are content-specific solutions and do not provide a general solution that works across all types of executable applications and application data. In addition, existing solutions cannot execute applications from external network locations. In most cases, applications must be installed on the internal flash storage of the device in order to run, and are not easily moved between cloud storage and the device. Furthermore, most applications lose all data (e.g., account information, user settings) when they are removed from the device.

These limitations are difficult to overcome as many devices cannot expect a high-speed network connection to be available at all times. Mobile devices such as tablets, smartphones, etc. should be able to operate when network connectivity is not available, or is available only at a low speed. Non-portable devices that use a persistent high-speed network connection to operate are not subject to the same network availability issues. This enables an opportunity to provide a complete virtualized flash storage solution that works for virtually all applications and the corresponding data.

Modern operating systems separate filesystems from the physical storage device on which the information is stored. Applications generally are not aware if the filesystem being utilized exists on a device's internal flash storage, or on a network storage location (e.g., in the cloud). By placing all application files and data on a single filesystem, it becomes easy to relocate the physical storage to an external location in a manner that is completely transparent to the rest of the system. As a result, applications and application data can be moved to cloud-based storage, a network-attached storage (NAS) device connected to a local network, an attached universal serial bus (USB) storage device, etc. Any one of these options can provide more storage than could ever be cost-effective to provide with internal flash storage. In most cases, these external locations easily provide more storage than a device would ever typically use, giving the perception that all applications are always available and immediately ready to launch.

In cases where cloud-based external storage is provided directly by the device manufacturer, additional enhancements can be made to improve the customer experience. As an example, when a user purchases an application from an online marketplace, the device manufacturer may have the ability to install the application directly into external storage reserved for the user. Thus, there may be no need to download and install the new application on the device itself. Once the application is purchased, the user may see an application that is immediately available to use.

In order for vendors to install applications directly into a user's cloud storage, the device operating system may support a clear separation of application executable files and customer-specific data. Further, the operating system may need to be aware of when changes are being made to external storage locations by other entities in order to maintain its internal state (e.g. a list of installed applications).

In one embodiment, the techniques described herein virtually expand a device's application and data storage capacity by transparently using external storage to give the perception that all purchased applications are always available and ready to launch. This enhances the customer experience in a number of ways, including obviating a user's need to manage which applications are installed locally on their device and which are currently archived in the cloud, eliminating the need to download an application before it can run or execute, and preventing the loss of application data (e.g., account settings) when an application is uninstalled it to free space in internal flash storage.

Supported external storage solutions may include, but are not limited to, cloud storage, such as Amazon Cloud Drive, for customer-specific files, content delivery network (CDN) storage for shared application files, storage available on a user's local network (e.g., desktop computer storage, NAS), an attached USB storage device, or other external storage device.

In one embodiment, the external storage location overlays a device's internal storage, transparently expanding the device's storage capacity well beyond the amount of internal flash storage on the device itself. In many cases, an external storage location will provide more space than will ever be required by the device. When cloud storage is used, there are additional enhancements that can be made to further improve the customer experience. Application files that are common between customers can be installed once and made available on geo-local CDNs. When an application is purchased, the CDN's installation is simply made visible on the customer's device, and can be ready to launch immediately. Files that are specific to a user can be stored in cloud storage reserved for the individual user.

In a similar manner, multiple devices registered to the same account could share the same external storage, effectively synchronizing application states (e.g., game scores) across devices. After a customer uses one device in their living room, they can go to their bedroom or vacation home and pick up where they left off, on a different device, without any additional hassle.

To mitigate the additional overhead of running applications from an external storage location, the device's internal flash storage can be used as a cache for the external filesystem. Frequently used applications can be transparently transferred to the device's internal flash storage so that the applications can start up just as quickly as if they had been installed on the device itself. Further, by leveraging observed application usage statistics for a particular user, it is possible to predict which applications the user is likely to request next, and pre-emptively cache or store those applications on the device prior to their use. In one embodiment, the most heavily used applications could be stored permanently on internal storage based on usage patterns or a customer's desire for a particular application to work in an "offline" mode. The ability to leverage external storage not only adds significant value to customers, but it also reduces the internal flash storage requirements for user devices, and allows devices to provide more value at a lower price point.

FIG. 1 is a block diagram of an example network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content. The media items may further include executable applications, such as games, social networking applications, productivity applications, etc.

The digital content providing system 120 may correspond to any feature or combination of features for providing electronic media items or other digital content to the user devices 102, 104. The digital content providing system 120 may include a network-accessible server-based functionality, various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, digital content providing system 120 corresponds to an entity which provides executable applications to users upon the users' purchase or download of the applications. In this role, the digital content providing system 120 may essentially act as an application seller or the like. In other cases, the digital content providing system 120 corresponds to an entity which provides applications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities. In one embodiment, the applications offered by digital content providing system 120 may be created by digital content providing system 120 itself. In another embodiment, the applications may be provided by digital content source 132. Digital content source 132 may be, for example, a developer, author, creator, etc. of executable applications or other digital content that provides the digital content to be distributed by digital content providing system 120.

The digital content providing system 120 may deliver, and the user devices 102, 104 receive, applications (or other media items), search results, upgrades, and/or other information via the network 106. For example, the user devices 102, 104 may download or receive applications from the digital content providing system 120. The digital content providing system 120 may also receive various requests (e.g., search queries), instructions and other data from the user devices 102, 104 via the network 106.

Communication between the user devices 102, 104 and the digital content providing system 120 may be enabled via any communication infrastructure. One example of such an infrastructure includes a combination of a wide area network (WAN) and wireless infrastructure, which allows a user to use the user devices 102, 104 to purchase digital content (e.g., applications) and execute the applications without being tethered to the digital content providing system 120 via hardwired links. The wireless infrastructure may be provided by one or multiple wireless communications systems, such as communication system 108. In one embodiment, communication system 108 may be a wireless fidelity (WiFi) hotspot connected with the network 106. Communication system 108 may also be a wireless carrier system that can be implemented using various data processing equipment, communication towers, etc. Alternatively, or in addition, the wireless carrier system may rely on satellite technology to exchange information with the user devices 102, 104. In another embodiment, communication system 108 may represent a wired communication system 108, where one or more of digital content providing system 120, communication enabling system 115, communication system 108, and user devices 102 and 104 are connected to one another using hardwired communication links (e.g., Ethernet).

The communication infrastructure may also include a communication-enabling system 115 that serves as an intermediary in passing information between the digital content providing system 120 and the communication system 108. The communication-enabling system 115 may communicate with the communication system 108 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to communication system 108, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, either or each of user devices 102 and 104, may include virtual installation module 140. Virtual installation module 140 may manage applications purchased, downloaded, requested, or otherwise acquired by the user of user device 102. In one embodiment, either or each of user devices 102 and 104 may include some amount of internal flash storage 110. This storage 110 may include one or more mass storage devices which can include, for example, flash memory, magnetic or optical disks, or tape drives; read-only memory (ROM); random-access memory (RAM); erasable programmable memory (e.g., EPROM and EEPROM); or any other type of storage medium. In one embodiment, virtual installation module 140 maintains the available applications in remote storage and utilizes internal flash storage 110 as a cache for the available applications. In one embodiment, the external storage solutions may include, but are not limited to, cloud storage 130 for user-specific data 135, a content delivery network (CDN), such as digital content providing system 120 for shared application data 125, storage available on a user's local network (e.g., desktop computer storage, NAS) such as the internal flash storage 110 of another connected user device 104, an attached USB storage device 112, or other external storage device. The filesystem utilized by virtual installation module 140 supports a clear separation of application executable files 125 and customer-specific data 135. In one embodiment, these separate data types may be stored on separate external storage devices, such as digital content providing system 120 and cloud storage 130, respectively.

In one embodiment, virtual installation module 140 can transparently transfer frequently used applications from remote storage to internal flash storage 110 so that the applications can start up just as quickly as if they had been installed on the user device 102 itself. Further, by leveraging observed application usage statistics for a particular user, virtual installation module 140 can predict which applications the user is likely to request next, and pre-emptively cache or store those applications in internal flash storage 110 prior to their use. In one embodiment, the most heavily used applications may be stored permanently on internal flash storage 110 based on usage patterns or a customer's desire for a particular application to work in an "offline" mode. Additional details of virtual installation module 140 are provided below with respect to FIGS. 2-8.

Figure 2:
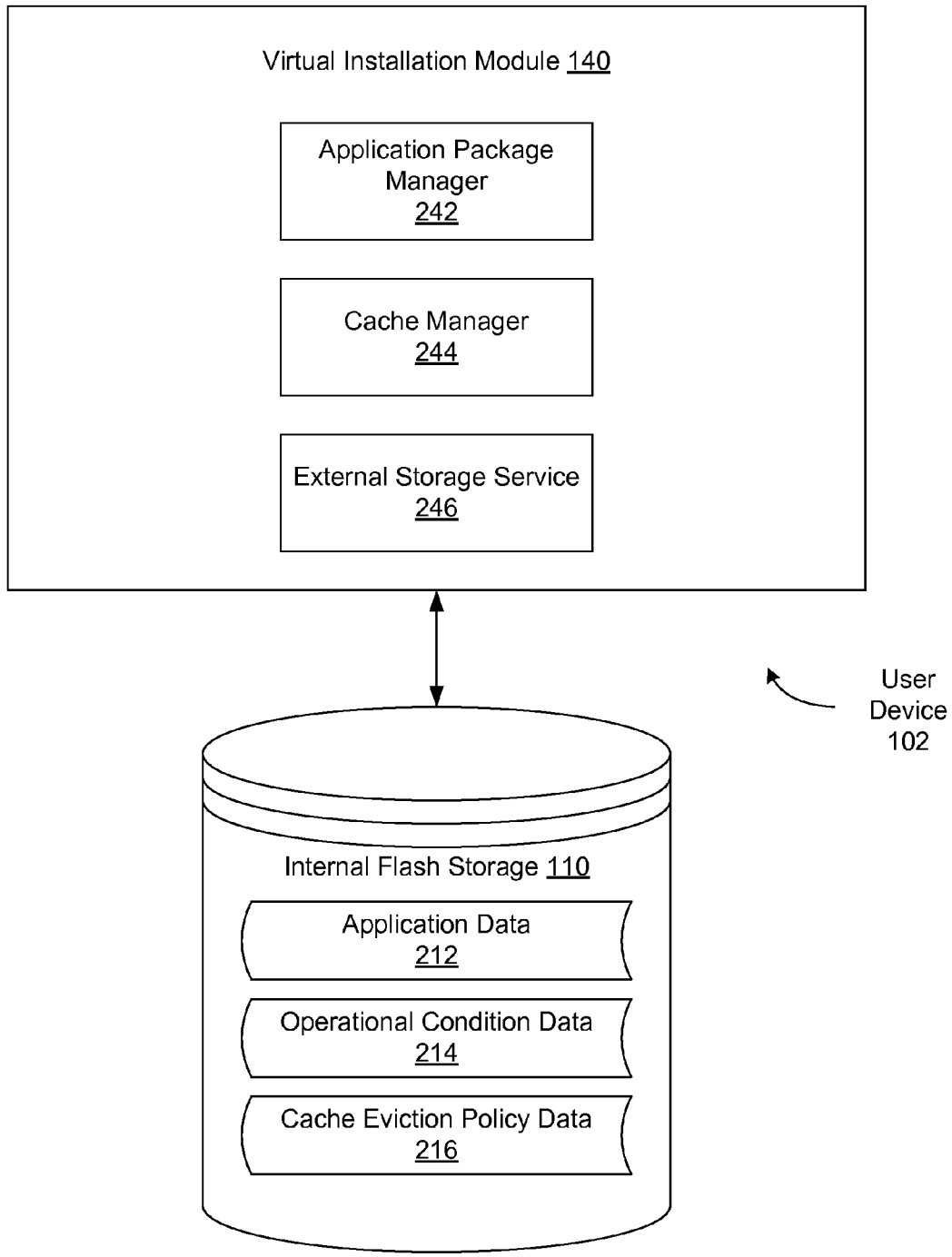
FIG. 2 is a block diagram illustrating a virtual installation module, according to an embodiment.

FIG. 2 is a block diagram illustrating a virtual installation module 140 that is included in user device 102, according to an embodiment. In one embodiment, virtual installation module 140 includes application package manager 242, cache manager 244 and external storage service 246. This arrangement of modules and components may be a logical separation, and in other embodiments, these modules or other components can be combined together or separated in further components, according to a particular embodiment. In one embodiment, internal flash storage 110 is connected to virtual installation module 140 and includes application data 212, operational condition data 214 and cache eviction policy data 216. In one embodiment user device 102 may include both virtual installation module 140 and internal flash storage 110. In other embodiments, virtual installation module 140 may include different and/or additional components which are not shown in order to simplify the description.

In one embodiment, application package manager 242 controls the execution of applications on user device 102. For example, application package manager 242 may receive requests to launch an application. To process such requests, application package manager may work with cache manager 244 and external storage service 246 to determine whether the corresponding application files are stored in internal flash storage 110 as application data 212 or whether they are in remote storage. Application package manager 242 may determine whether the application can run or execute from remote storage, or whether the application files should be cached or stored in internal flash storage 110 and run or execute locally. Based on this determination, application package manager 242 may initiate execution directly from the remote storage or initiate an intelligent download of the application files from remote storage (e.g., digital content providing system 120, cloud storage 130, USB storage 112, internal flash storage 110 of another user device 104).

In one embodiment, cache manager 244 controls data access to internal flash storage 110. For example, cache manager 244 may read and write application data 212 to internal flash storage 110 based on instructions from application package manager 242. Cache manager 244 may also store operational condition data 214 in internal flash storage 110. Operational condition data 214 may include conditions about the user device 102, network 106, and remote storage device that could affect the execution of the application. These conditions may include, for example, network speed, processor speed, device hardware characteristics, type of storage utilized, etc. In addition, cache manager 244 may be responsible for evicting application data 212 from internal flash storage 110 according to a cache eviction policy. The policy may be stored as cache eviction policy data 216, and may include, for example, least recently used, least frequently used, first in first out, or some other policy.

In one embodiment, external storage service 246 controls data access to remote storage devices including digital content providing system 120, cloud storage 130, USB storage 112, internal flash storage 110 of another user device 104, or some other remote storage. External storage service 246 may store application data in the remote storage when purchased or otherwise acquired by the user and may retrieve that data from remote storage when requested by the user. In one embodiment, external storage service 246 may run or execute applications directly from remote storage based on a determination by application package manager 242 or may intelligently retrieve application files for caching in internal flash storage according to a dynamic execution path. Additional details of the application package manager 242, cache manager 244 and external storage service 246 will be provided below.

Figure 3:
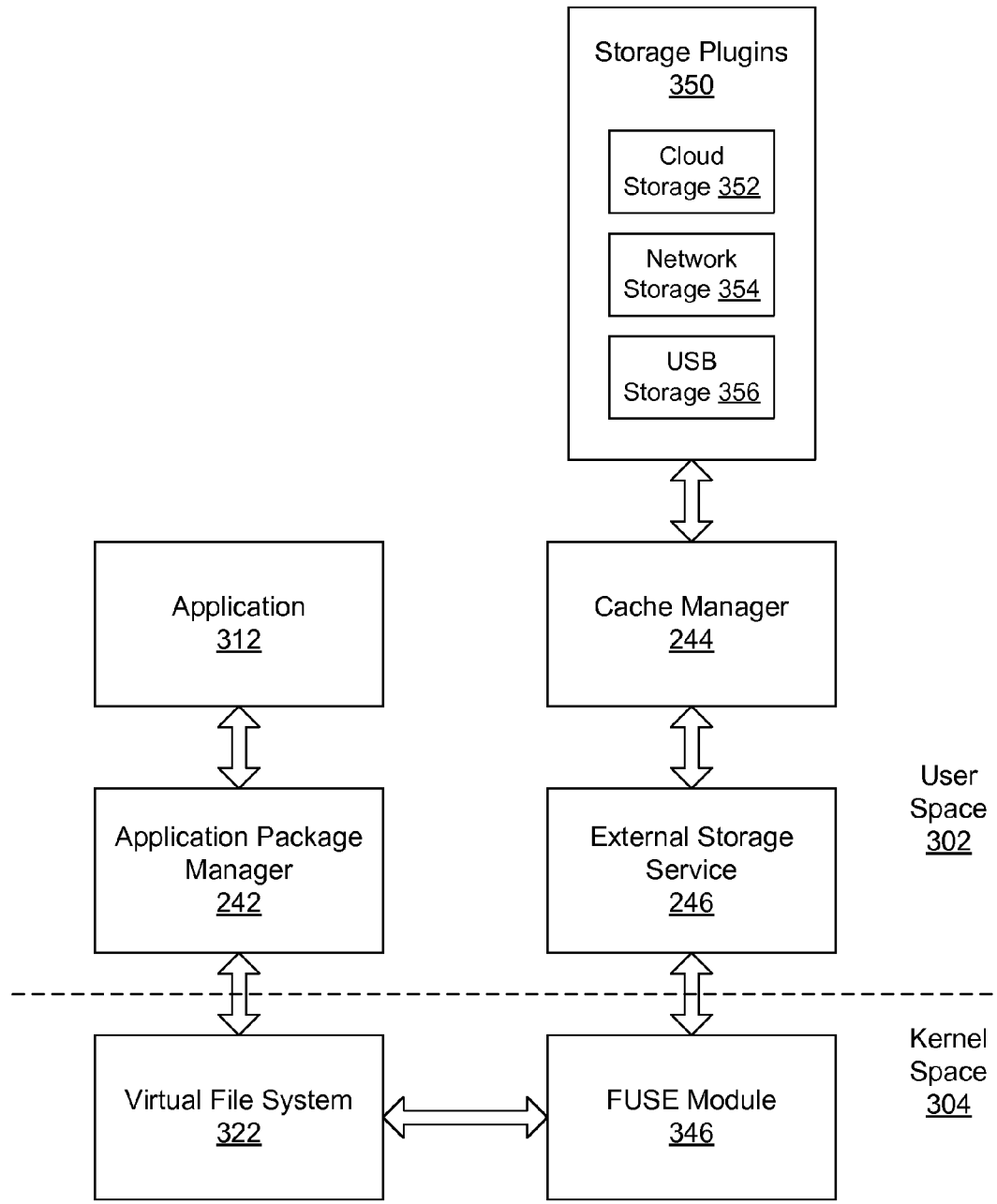
FIG. 3 is a block diagram illustrating an execution path of a filesystem access on a user device, according to an embodiment.

FIG. 3 is a block diagram illustrating an execution path of a filesystem access on a user device, according to an embodiment. In one embodiment, application storage is overlaid by an external storage solution using the "Filesystem in Userspace" (FUSE) support in the Linux kernel. FUSE redirects filesystem requests for a specific directory tree (i.e., mount point) to a userspace process for handling. FIG. 3 illustrates the execution path of a filesystem access using FUSE. In one embodiment, a particular application 312 being executed requests the contents of a given directory in the kernel space 304 through application package manager 242. The request is redirected by virtual files system 322 and FUSE module 346 the operating system kernel 304 and ultimately handled by an external storage service 246 in user space 302. The external storage service 246 programmatically determines the list of files and directories that should be listed for the originally requested directory and returns the result back to the kernel 304, which in turn is given back to the application 312 as the result of the filesystem operation. External storage service 246 could chose to list the contents of some other directory on the filesystem, or an external storage location. Other requests such as reading and writing files may be handled in a similar manner.

Although FUSE adds additional software layers to each filesystem request, the overhead is mostly negligible for low-speed storage operations. For high-speed internal flash, FUSE has a larger overhead, but overall I/O performance is still sufficiently high so as not to degrade the user experience. In the worst case, FUSE reduces internal flash read performance from 78.23 MB/s to 67.61 MB/s.

FUSE module 346 can redirect filesystem accesses to an external storage service 246 that handles filesystem operations for these directories in an isolated manner that does not require significant changes to the operating system itself. Whenever the application package manager 242 attempts to install, uninstall, or launch an application 312, the external storage service 246 intercepts the filesystem requests and either cache manager 244 services the requests by using the application cache in internal flash storage 110, or, if not found in internal flash storage 110, the requests are redirected to one of the available storage plugins 350 that manage application files in external locations.

The plugins shown include the "Cloud Storage" plugin 352, a "Network Storage" plugin 354, and a "USB Storage" plugin 356. The "Cloud Storage" plugin 352 may use DCP to interface with cloud storage 130 and access user specific data 135, and connects to digital content providing system 120 (or another CDN) to access application data 125 that is common to all customers. The "Network Storage" plugin 354 may mount a CIFS network filesystem and allows applications to be stored on another device 103 or NAS that is available on a customer's home network. The "USB Storage" plugin 356 stores application data on an attached USB storage device 112, which could be a thumb drive, a portable hard drive, or even a wall-powered high-performance mechanical hard drive.

Figure 4:
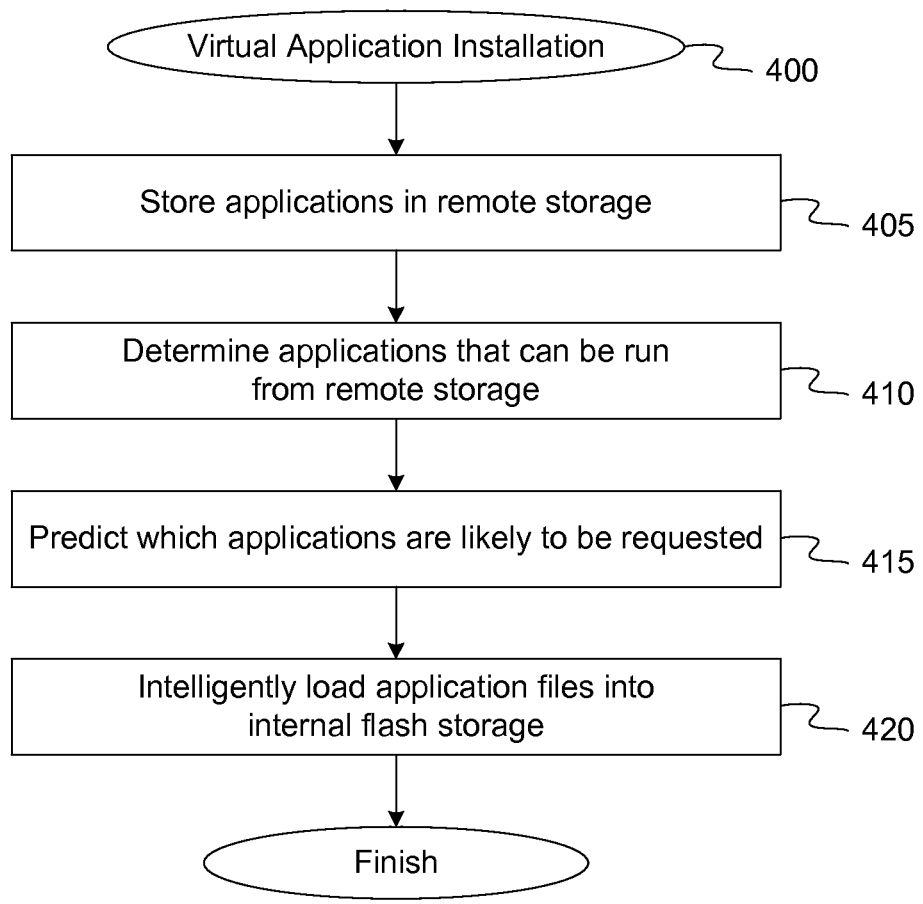
FIG. 4 is a flow diagram illustrating a virtual application installation method, according to an embodiment.

FIG. 4 is a flow diagram illustrating a virtual application installation method, according to an embodiment of the present invention. The method 400 may be performed by processing logic that comprises hardware (e.g., circuitry, dedicated logic, programmable logic, microcode, etc.), software, firmware, or a combination thereof. The processing logic is configured to virtually install an application in a filesystem independent of the underlying storage such that the application is readily accessible via a user device while maintaining available internal flash storage on the user device for other applications. In one embodiment, method 400 may be performed by virtual installation module 140, as shown in FIGS. 1 and 2.

Referring to FIG. 4, at block 405, method 400 store applications in remote storage. In one embodiment, when a user purchases, downloads or otherwise acquires an application from digital content providing system 120, rather than downloading all of the application files to internal flash storage 110 on user device 102, virtual installation module 140 may store the application data in remote storage. This remote storage can include, for example, digital content providing system 120, cloud storage 130, USB storage 112, internal flash storage 110 of another user device 104, or some other remote storage. The application data may remain on remote storage until the application is requested by the user in order to maintain free space in internal flash storage 110.

At block 410, method 400 determines one or more applications that can be run or executed directly from the remote storage. In one embodiment, virtual installation module 140 analyzes the various applications in remote storage to determine which application can be run or execute directly from remote storage and which should be downloaded to internal flash storage 110 before being executed. Some applications are more demanding on storage than others. If the external storage medium is fast enough to satisfy an application's needs, the application may not need to be cached or stored. In order to programmatically determine if an application can be run or executed directly from an external storage location, performance measurements on each external storage device that is added to the system are taken, and each application's demand is measured. New applications that are made available could initially be run or executed from internal flash until enough data can be collected about the application's storage demands to allow it to run or execute from other locations. Application data could be collected from the installed customer base, or from testing during ingestion. For example, one application may read an average of 9 MB/s and make an average of 92 separate read requests per second. Conversely, a second application may only reads an average of 0.5 MB/s while making roughly 10 read requests per second. In one embodiment, the performance of each remote storage device is measured while quickly reading 128K blocks of data randomly across a 2 GB file, simulating a typical application execution. The performance of a storage device also depends heavily on the performance of the RAM filesystem caching for an application's data access patterns. In another embodiment, the performance of a storage device may also include the network latency and bandwidth of the network over which the remote storage is connected (e.g., network 106). Based on the measurements, it may be determined that the second application should run fluidly from most USB storage or from a wired LAN, but may need to be copied locally when installed on a CDN. The options for the first application may be more limited, as it might run fluidly from a USB thumb drive as long as it makes read requests in a manner that optimize the use of the filesystem cache. Unfortunately, this cannot always be assumed so the application may be copied to internal flash in order to run or execute. The process is described in more detail with respect to FIG. 5.

At block 415, method 400 predicts which applications are likely to be requested by the user of user device 102. In one embodiment, virtual installation module 140 analyzes the various applications in remote storage to predict which applications are likely to be requested by the user. Based on this prediction, virtual installation module 140 can begin caching the application files or chunks of the files (e.g., any sub-portion of an application file) in internal flash storage 110 before the actual request is received in order to begin execution of the application with minimal or no latency. The best possible user experience may occur when application files are copied to internal flash before a customer decides to use the application. Available information may be used to help predict what applications a customer is likely to use. This information can include applications that have been recently purchased, applications that have been recently used, applications that are currently being viewed in an application launcher, etc. In one embodiment, once the user device is attached to external storage, copying applications that have been recently used to the internal flash may begin. If there is space left over after this operation, remaining applications in the user's library may be copied over. While a customer is interacting with their device, virtual installation module 140 may also start copying an application when a customer dwells on it in a list for a certain period of time (e.g., 750 ms). If an application will perform adequately from the external storage location on which it is installed, there is no need to copy the application into internal flash. In these cases, more internal flash is available to cache or store applications with higher storage demands. The process is described in more detail with respect to FIG. 6.

At block 420, method 400 intelligently loads applications files into internal flash storage 110 on user device 102. In one embodiment, virtual installation module 140 analyzes the various applications in remote storage to intelligently cache or store the corresponding application files into internal flash storage 110. In one embodiment, an application has a dynamic execution path that describes the likely sequence of execution of the application for a particular user. In one embodiment, the caching is performed based on data blocks or chunks of a given size. The application file chunks may be any subset of the data of an application. In one embodiment, an application file may be smaller than the block size, in which case, the entire file may be cached or stored in one operation. If, however, the application file is larger than the block size, and thus contains multiple blocks, the blocks may be cached or stored one at a time, potentially in different operations, until the entire file has been cached or stored. In one embodiment, the file chunks have a fixed size. In another embodiment, virtual installation module 140 can dynamically determine the chunk size and request file chunks of the determined size (e.g., using a file offset and length). The dynamic determination may be made using considerations, such as for example, the speed of the network connection, the location of the chunk in the file, the remote storage being used, etc. By caching the application file chunks using to the user's current location in the application and the dynamic execution path, the application may begin executed sooner than if the application file chunks were downloaded from remote storage in sequential, random, or other order. In the event that an application is launched without having any data stored on internal flash, it may not be necessary to need to wait until the entire application has been copied before execution begins. If there is a large install base for the application being launched, and metrics have been collected on what portions of file chunks are accessed in which order for the first few minutes of the application, the application can be launched after copying over just this portion of data. The remaining file chunks continue to be downloaded in the background while the application is running. The process is described in more detail with respect to FIG. 7.

Figure 5:
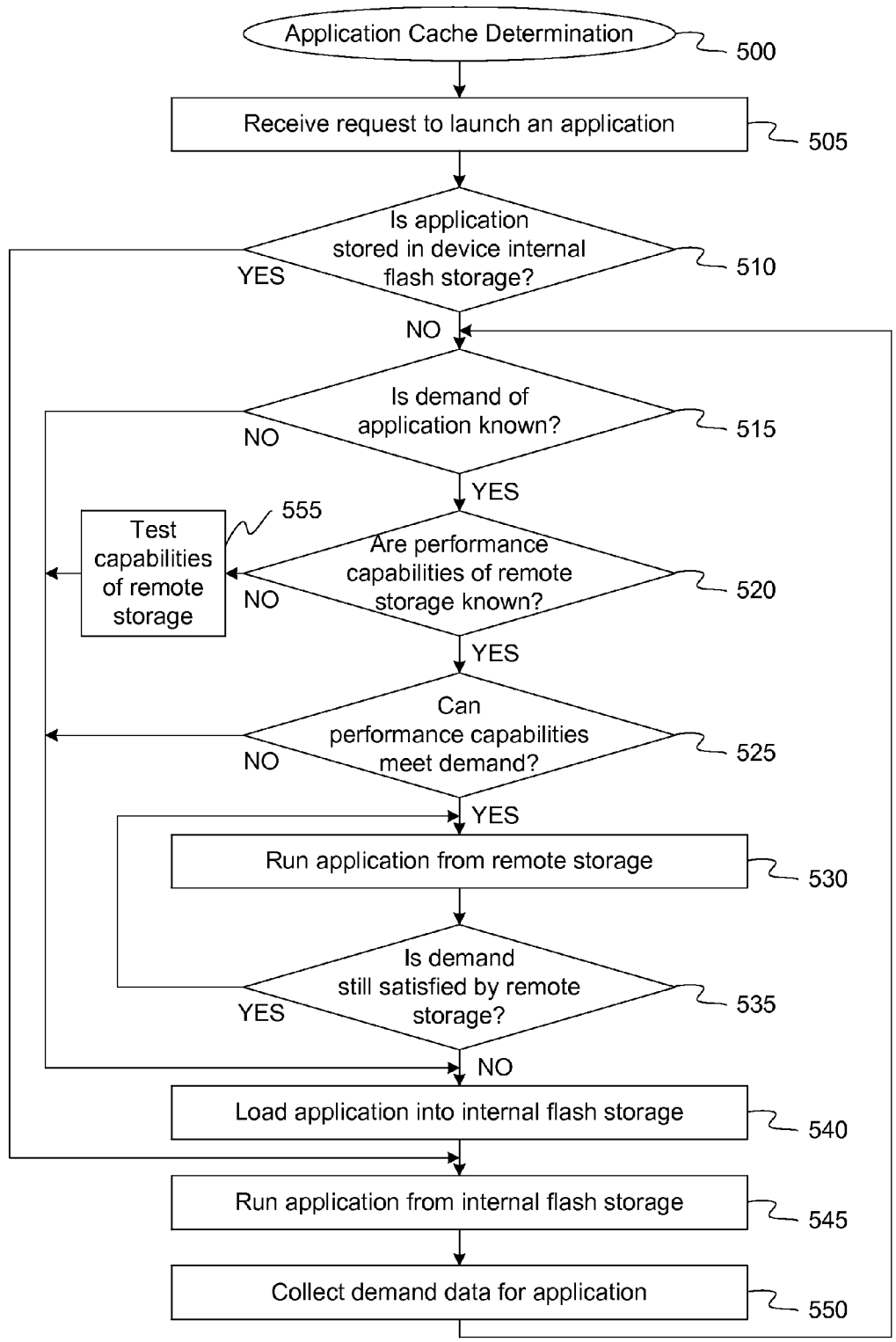
FIG. 5 is a flow diagram illustrating a method for determining whether an application should be cached on internal flash storage, according to an embodiment.

FIG. 5 is a flow diagram illustrating a method for determining whether an application should be cached or stored on internal flash storage, according to an embodiment of the present invention. The method 500 may be performed by processing logic that comprises hardware (e.g., circuitry, dedicated logic, programmable logic, microcode, etc.), software, firmware, or a combination thereof. The processing logic is configured to determine whether an application can be run or executed directly from remote storage based on the demand of the application and the performance capabilities of the remote storage. In one embodiment, method 500 may be performed by virtual installation module 140, as shown in FIGS. 1 and 2.

Referring to FIG. 5, at block 505, method 500 receives a request to launch an application. In one embodiment, application package manager 242 receives a request from a user, from the operating system, or from another application to launch a particular application.

At block 510, method 500 determines whether the requested application is stored in internal flash storage 110 on user device 102. In one embodiment, application package manager 242 forwards the request through to FUSE module 346, which reroutes the request depending on the location of the application file chunks, as discussed above. If the application is in internal flash storage 110, method 500 continues to block 545.

If the application is not in internal flash storage 110, at block 515, method 500 determines if the resource demands of the application are known. In one embodiment, the resource demands of the application (e.g., issuing rate of read requests during execution) are measured and provided with the application in metadata. In one embodiment, the resource demands of an application may be a temporal and file-specific variable. For example, different application files or file chunks may have different resource demands and thus, the demand can likewise depend on current performance capabilities of the network and remote storage device. Application package manager 242 may send a request through external storage service 246 to determine if this demand information is available from the application in remote storage. If the resource demands of the application are not known, method 500 continues to block 540.

If the resource demands of the application are known, at block 520, method 500 determines whether the performance capabilities of the remote storage are known. In one embodiment, the performance capabilities of the remote storage are measured and stored in internal flash storage 110 as part of operational condition data 214. In another embodiment, application package manager 242 may send a request through external storage service to determine the performance capabilities of the remote storage. If the performance capabilities are not known, at block 555, method 500 tests the performance capabilities of remote storage and proceeds to block 540.

If the performance capabilities of the remote storage are known, at block 525, method 500 determines whether the performance capabilities of the remote storage can meet the demand of the application. In one embodiment, application package manager 242 compares the demand of the application (e.g., issuing rate of the application) to the performance capabilities of the remote storage (e.g., processing rate of the storage device and network). If the performance capabilities are at least equal to or greater than the demand of the application, application package manager 242 may determine that the performance capabilities can meet the demand. If not, method 500 continues to block 540.

If so, at block 530, method 500 runs or executes the application from the remote storage. In one embodiment, external storage service 246 issues read requests for particular file chunks from application data in remote storage as requested by the application through application package manager 242. Once received on user device 102, the application file chunks are executed and the process continues.

At block 535, method 500 monitors the application execution to determine whether the demand is still satisfied by the remote storage. In one embodiment, application package manager 242 periodically compares the demand of the application to the performance capabilities of the remote storage. For example, application package manager 242 may perform a comparison every 30 seconds, 1 minute, or some other period of time. As either the demand or the capabilities may change over time, the status may also change. If so, at block 530, method 500 continues to run or execute the application from remote storage.

If not, at block 540, method 500 loads the application into internal flash storage 110. In one embodiment, execution is paused while external storage service 246 requests the application file chunks from remote storage and cache manager 244 copies the application data 212 into internal flash storage 110. In another embodiment, rather than moving the application directly to internal flash storage 110, method 500 may move the application to some other available storage device that can satisfy the application demand. For example, there may be a hierarchy of storage devices where the devices are arranged based on their performance capabilities. If there is another available storage device that can meet the application demand, method 500 may move the application to that storage device, in order to maintain free space in internal flash storage 110.

At block 545, method 500 runs or executes the application from internal flash storage. Application package manager 242 may execute the application data 212 directly from internal flash storage 110 as it is requested by the application.

At block 550, method 500 collects demand data for the application and returns to block 515. In one embodiment, application package manager measures the resource demands of the application (e.g., issuing rate of read requests during execution) and stores the results for future use.

Figure 6:
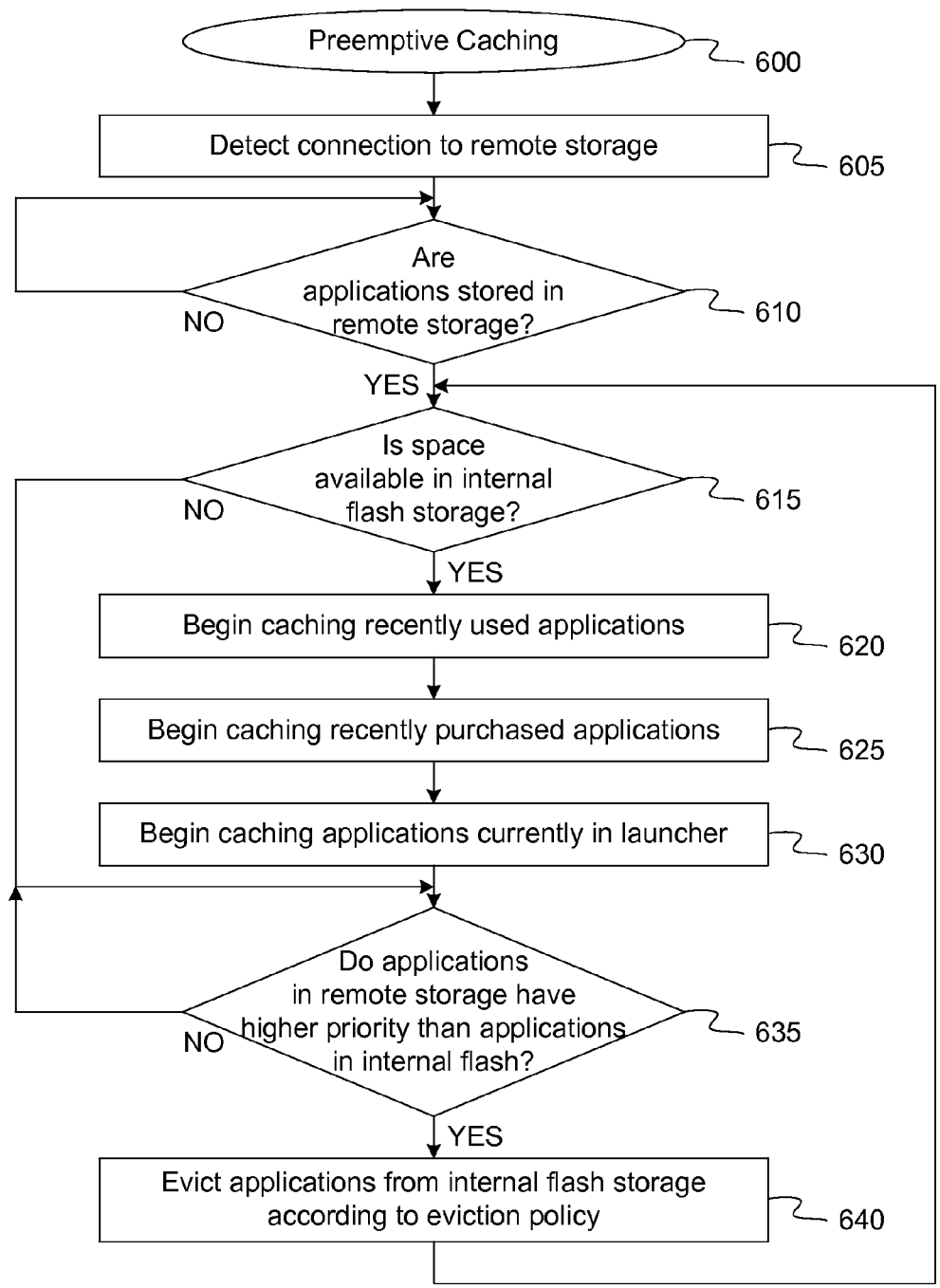
FIG. 6 is a flow diagram illustrating a pre-emptive application caching method, according to an embodiment.

FIG. 6 is a flow diagram illustrating a pre-emptive application caching method, according to an embodiment of the present invention. The method 600 may be performed by processing logic that comprises hardware (e.g., circuitry, dedicated logic, programmable logic, microcode, etc.), software, firmware, or a combination thereof. The processing logic is configured to predict which applications are likely to be requested and preemptively cache or store at least a portion of those applications in internal flash storage. In one embodiment, method 600 may be performed by virtual installation module 140, as shown in FIGS. 1 and 2.

Referring to FIG. 6, at block 605, method 600 detects a connection to remote storage. In one embodiment, external storage service 246 notifies application package manager 242 when user device 102 is connected to remote storage either directly or over network 106.

At block 610, method 600 determines whether any applications are stored in the remote storage. In one embodiment, external storage service 246 queries the remote storage and notifies application package manager 242 as to whether any applications are stored in the remote storage. If applications are not stored in the remote storage, at block 610, method 600 continues to monitor the remote storage for the presence of applications.

If applications are stored in the remote storage, at block 615, method 600 determines if space is available in internal flash storage 110. In one embodiment, cache manager 244 controls internal flash storage 110 including monitoring the levels of free space. Cache manager 244 may provide application package manager 242 with an indication of whether space is available in internal flash storage 110. If space is not available in internal flash storage 110, method 600 continues to block 635.

If space is available in internal flash storage 110, at block 620, method 600 begins caching recently used applications. In one embodiment, through external storage service 246, application package manager 242 requests the application data from remote storage corresponding to recently used applications. In one embodiment, these may include applications used within a certain period of time (e.g., the past 24 hours) or some number of most recently used application (e.g., the last five applications used). Since the user recently used these applications, it may be likely that they will need to use them again.

At block 625, method 600 begins caching recently purchased applications. In one embodiment, through external storage service 246, application package manager 242 requests the application data from remote storage corresponding to recently purchased or acquired applications. Since the user recently purchased or otherwise acquired an application, it may be likely that they will request to execute the application in the near future.

At block 630, method 600 begins caching applications currently in an application launcher. In one embodiment, through external storage service 246, application package manager 242 requests the application data from remote storage corresponding to applications in an application launcher. Certain operating systems may include a launcher that displays the applications available to the user. Depending on the number of applications available, not all of the applications may be visible at one time. For example, there could be a scrolling list of applications or multiple pages of applications. In one embodiment, at least a portion of the applications that are currently visible may be copied from remote storage to internal flash storage, as it is likely that the user may request to launch one of the currently visible applications.

At block 635, method 600 determines whether the applications in remote storage have a higher priority than application in internal flash storage 110. In one embodiment, application package manager 242 may track a priority of the available applications based on the factors described above. If an application in remote storage has been more recently used than an application in internal flash storage 110, has been recently purchased, or is visible in the application launcher, application package manager 242 may assign that application a higher priority value than another application in internal flash storage which does not meet those criteria.

If no application in remote storage have a higher priority, at block 635, method 600 continues to monitor the priority of the applications in remote storage and in internal flash storage 110.

If an application in remote storage does have a higher priority, however, at block 640, method 600 evicts one or more application from internal flash storage according to an eviction policy 216. Cache manager 244 may be responsible for evicting application data 212 from internal flash storage 110 according to a cache eviction policy. The policy may be stored as cache eviction policy data 216, and may include, for example, least recently used, least frequently used, first in first out, or some other policy.

Figure 7:
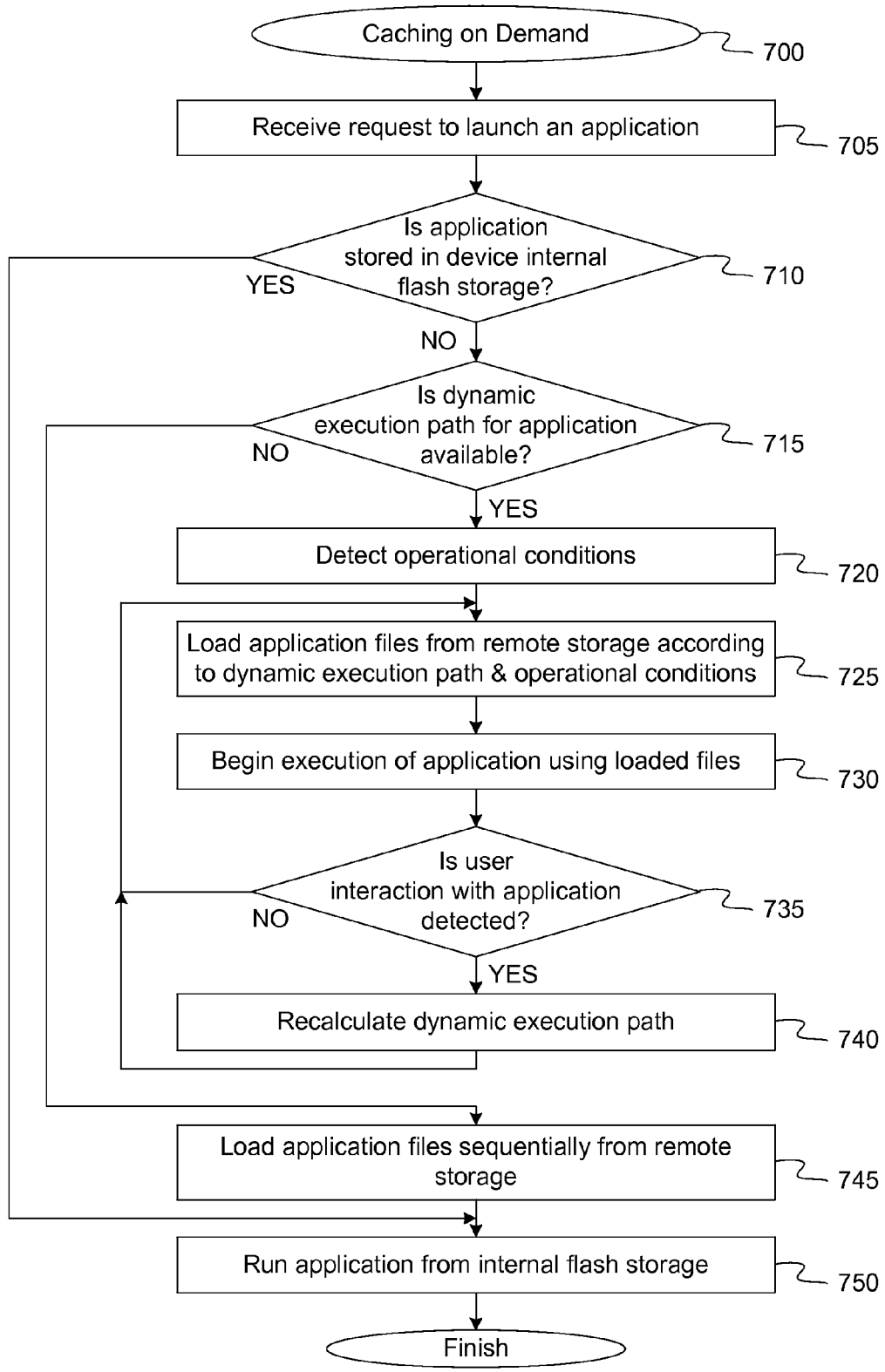
FIG. 7 is a flow diagram illustrating an on-demand application caching method, according to an embodiment.

FIG. 7 is a flow diagram illustrating an on-demand application caching method, according to an embodiment of the present invention. The method 700 may be performed by processing logic that comprises hardware (e.g., circuitry, dedicated logic, programmable logic, microcode, etc.), software, firmware, or a combination thereof. The processing logic is configured to intelligently load application file chunks from remote storage to internal flash storage according to a dynamic execution path for the application. In one embodiment, method 700 may be performed by virtual installation module 140, as shown in FIGS. 1 and 2.

Referring to FIG. 7, at block 705, method 700 receives a request to launch an application. In one embodiment, application package manager 242 receives a request from a user, from the operating system, or from another application to launch a particular application. In one embodiment, the request is based on a determination made by preemptive caching method 600, as described above.

At block 710, method 700 determines whether the requested application is stored in internal flash storage 110 on user device 102. In one embodiment, application package manager 242 forwards the request through to FUSE module 346, which reroutes the request depending on the location of the application file chunks, as discussed above. If the application is in internal flash storage 110, method 700 continues to block 750.

If the application is not in internal flash storage 110, at block 715, method 700 determines if a dynamic execution path is available for the requested application. In one embodiment, application metadata may include a dynamic execution path for the application that indicates an order in which subsequent application pages or file chunks will likely be utilized based on the current state of the application. One embodiment, of a dynamic execution path is described below with respect to FIG. 8.

If so, at block 720, method 700 detects the operational conditions of user device 102 and the remote storage. Operational condition data 214 may include conditions about the user device 102, network 106, and remote storage device that could affect the execution of the application. These conditions may include, for example, network speed, processor speed, device hardware characteristics, type of storage utilized, etc.

At block 725, method 700 begins loading application file chunks from remote storage into internal flash storage according to the dynamic execution path and the operational conditions. In one embodiment, external storage service 246 requests application file chunks in an order specified by the dynamic execution path. For example, an initial page of the application may provide several options. Depending on past user history and the history of other users with the application, the dynamic execution path may indicate that one of those options is more likely to be selected by the user. Accordingly, external storage service 246 may request file chunks corresponding to the more likely option first so that they are available in internal flash storage 110 when needed by the application. In one embodiment, virtual installation module 140 keeps track of which chunks correspond to a given file and which of those chunks have already been cached or stored. For example, a bitmap or sparse file may indicate which chunks have already been received. In this manner, virtual installation module 140 can tell whether a given chunk indicated by the dynamic execution path needs to be downloaded from remote storage or whether it is already present in internal flash storage 110.

At block 730, method 700 begins execution of the application using the file chunks loaded at block 725. Application package manager 242 may use application data 212 from internal data store for execution of the application.

At block 735, method 700 determines whether user interaction with the application is detected. In one embodiment, application package manager 242 detects user interaction with the application. For example, the user may select one of the options presented during the initial screen of the application, thereby moving to a different screen in the application. If no user interaction is detected, method 700 returns to block 725 and continues to load application file chunks according to the dynamic execution path and the operational conditions.

If user interaction is detected, at block 740, method 700 recalculates the dynamic execution path. Since the user is now at a new screen in the application, there may be another set of options which could be chosen by the user, each representing a different branch of the dynamic execution path and having different corresponding file chunks. In one embodiment, the dynamic execution path may also indicate a confidence level indicating how likely a given file chunk is to be needed. In one embodiment, method 700 may cache or store all file chunks that have a confidence level above a certain threshold. In addition, in order to maintain space in internal flash storage 110, method 700 may evict file chunks that have a confidence level below a different threshold, as they are so unlikely to be used in the near future based on the user's current location in the application.

If, at block 715, method 700 determines that a dynamic execution path is not available for the requested application, at block 745, method 700 loads application file chunks sequentially from remote storage to internal flash storage 110. At block 750, method 700 runs or executes the application from internal flash storage 110.

Figure 8:
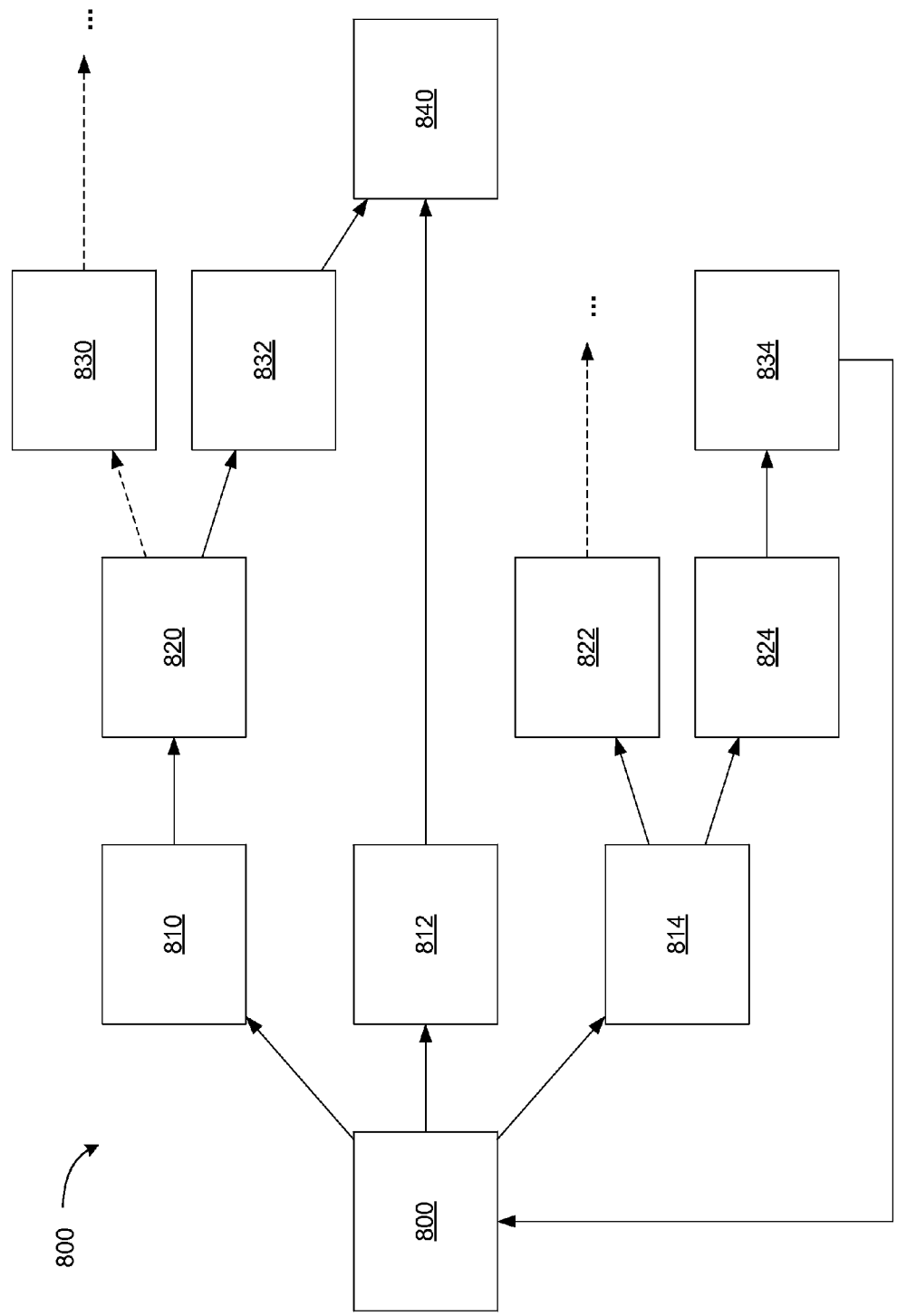
FIG. 8 is a block diagram of a navigation tree showing various paths that a user might take through an application, according to an embodiment.

FIG. 8 is a block diagram of a navigation tree showing various paths that a user might take through an application, according to an embodiment. In one embodiment, the navigation tree 800 includes a number of nodes that each correspond to a particular page, screen, menu or other user interface element in the corresponding application. In one embodiment, navigation tree 800 is one representation of the dynamic execution path associated with a particular application. For example, page 800 may represent the first page that a user accesses when the application is initialized. The user may typically access one of three different pages from the first page 800: page 810, page 812, or page 814. However, when this particular user accesses page 812, the user typically navigates to page 840 next. Because each user interaction with the pages may result in application data being transmitted to user device 102 from the remote storage, the navigation tree can indicate the likelihood that the user accesses page 840 from page 812. As a result, if the user accesses page 812, virtual installation module 140 can cache or store page 840 in internal flash storage 110.

In some embodiments, navigation tree 800 can utilize user interaction data regarding interactions of other users of the application. This can result in a larger data set from which to generate prediction information. Such a larger data set may be useful in generating predictions when, e.g., the current user has not yet accessed various portions of the application or has not yet performed particular actions. By using the user interaction data from other users, the navigation tree can be used even for first time users or users for relatively little interaction data has been recorded.

The various users for which user interaction data has been collected may be associated with demographic categories, personal characteristics, and the like. For example, each user may be associated with a user profile that includes demographic information about the user. User interaction data for similar users may be accessed when generating prediction information for a particular user. In this case, a similar user may be a user that has been classified or categorized into one or more identical or similar demographic categories, such as age, gender, ethnicity, geographic location, occupation, and the like. In addition to demographic categories, other personal characteristics, such as information about content interests, hobbies, and the like may be used to identify similar users or to group or classify users. In some embodiments, rather than use only user interaction data associated with users in a similar demographic category, such data may be weighted. In such cases, data from users in other demographic categories may still be analyzed and used to generate prediction information, while the information regarding users determined to be most like the current user is given more weight.

With continuing reference to FIG. 8, users in demographic category A may typically access page 814 from the main page 800, while users in demographic category B may typically access page 810 from the main page. In addition, there may be many more users in demographic category B than demographic category A. If the likely navigation behaviors of the entire user base are utilized, the prediction information generated may always indicate that a user will access page 810 from the main page. However, by considering the demographic categorization of a particular user and user interaction data associated with users of the same demographic category, a different and potentially more accurate result may be obtained. In the present example, if the current user has been categorized as being in demographic category A, a prediction that the user will likely access page 814 next may be made, and that predication may be statistically more likely to be accurate than a prediction that the user will access page 810.

In some embodiments, navigation tree 800 can utilize user interaction data regarding interactions of the current user with other applications or with other systems altogether. For example, a user may use the current application to view videos offered by the network computing provider, while the same user may use a different application to shop for goods or services. That additional user interaction data may be analyzed to obtain further insight into which actions the user may perform next. For example, if a user was recently shopping, via a separate shopping application (or via a separate network computing provider) for books about car repair, and that same user typically views instructional videos, virtual installation module 140 may begin to cache a video player application.

Figure 9:
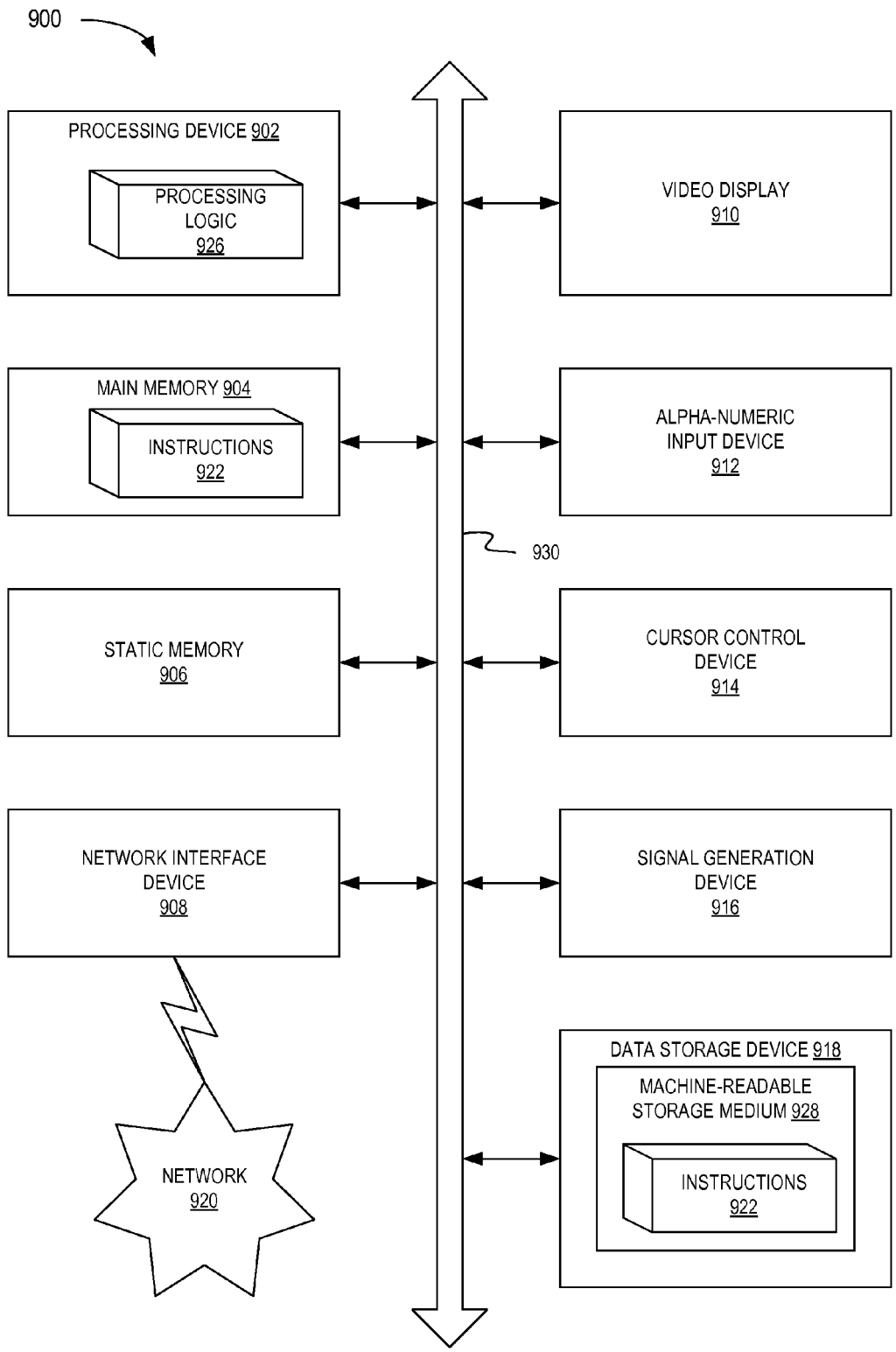
FIG. 9 is a block diagram illustrating one embodiment of a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of digital content providing system 120.

The exemplary computer system 900 includes a processing device 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 embodying any one or more of the methodologies or functions described herein. The instructions 922 may also reside, completely or at least partially, within the main memory 904 and/or within processing logic 926 of the processor 902 during execution thereof by the computer system 900, the main memory 904 and the processor 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 10:
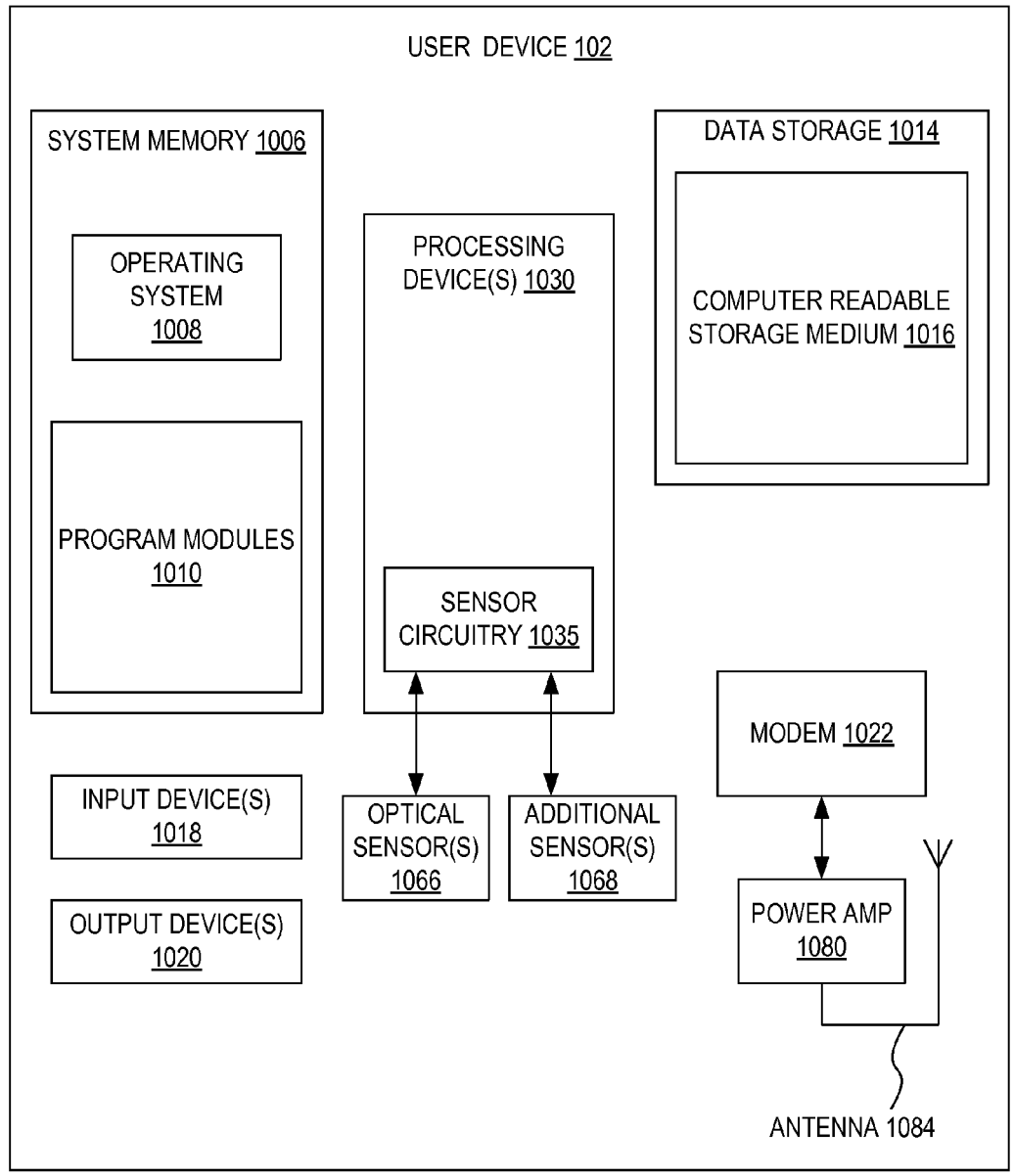
FIG. 10 is a block diagram illustrating an exemplary user device, according to an embodiment.

FIG. 10 is a block diagram illustrating an exemplary user device 102. In one embodiment, the user device 102 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 102 includes a processing device 1030, such as one or more CPUs, microcontrollers, field programmable gate arrays, or other types of processing devices. The user device 102 also includes system memory 1006, which may correspond to any combination of volatile and/or non-volatile storage mechanisms. The system memory 1006 stores information which provides an operating system component 1008, various program modules 1010 and/or other components. The user device 102 performs functions by using the processor(s) 1030 to execute instructions provided by the system memory 1006.

The user device 102 also includes a data storage device 1014 that may be composed of one or more types of removable storage and/or one or more types of non-removable storage. The data storage device 1014 includes a computer-readable storage medium 1016 on which is stored one or more sets of instructions embodying any one or more of the methodologies or functions described herein. As shown, instructions may reside, completely or at least partially, within the computer readable storage medium 1016, system memory 1006 and/or within the processing device 1030 during execution thereof by the user device 102, the system memory 1006 and the processor(s) 1030 also constituting computer-readable media. The user device 102 may also include one or more input devices 1018 (keyboard, mouse device, specialized selection keys, etc.) and one or more output devices 1020 (displays, printers, audio output mechanisms, etc.).

The user device 102 further includes a wireless modem 1022 to allow the user device 102 to communicate via a wireless network (e.g., such as provided by the communication system 108) and/or with other computing devices, such as remote computers, the item providing system, online book stores, electronic catalogs for libraries, and so forth. The wireless modem 1022 may allow the user device 102 to handle both voice and non-voice communications (such as communications for text messages, media messages, media downloads, web browsing, etc.) with the communication system 108. The wireless modem 1022 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. The wireless modem 1022 may generate signals and send these signals to power amplifier (amp) 1080 for amplification, after which they are wirelessly transmitted via antenna 1084. In addition to sending data, antenna 1084 also receives data, which is sent to wireless modem 1022 and transferred to processing device 1030.

In one embodiment, user device 102 includes an optical sensor 1066. The optical sensor 1066 may be a low resolution camera (e.g., having 0.2 or 0.3 Megapixels) that takes images (e.g., of a user's eyes) on a periodic basis. Alternatively, the optical sensor 1066 may have a higher resolution, such as 1 Megapixel up to 10 or more Megapixels. The optical sensor 1066 may be positioned such that images are taken of a user's face while the user holds the user device 102 in front of his face in a standard reading position. Therefore, the optical sensor 1066 may be used to track user eye movement during reading.

In one embodiment, user device 102 includes one or more additional sensors 1068 such as a physical contact sensor, close proximity sensors, or motion sensors. The sensors 1068 can detect the presence of human body parts, and convey information regarding the detected presence to processor(s) 1030. In one embodiment, the sensors 1068 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 1068 may also be optical (e.g., infrared) sensors that use an emitter and receiver pair to detect the presence of opaque objects. Alternatively, the sensors 1068 may be inductive sensors, which include an inductive loop. When the presence of a human body part (or metal object) is brought close to the inductive sensor, an induction of the inductive loop changes, causing the human body part to be detected. Alternatively, the sensors 1068 may be ultrasonic sensors that emit an ultrasonic signal and measure a time duration between when a signal is transmitted and the reflection of that signal received (a.k.a., flight response). The sensors 1068 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 1068 include a motion sensor, such as an accelerometer or one or more gyroscopes. The user device 102 may use motion data from motion sensors to determine whether a user is holding the user device 102. For example, if the user device 102 experiences constant minor accelerations, it may be determined that the user device 102 is being held in a user's hand. Additionally, if the user device 102 is at a particular angle (detectable based on acceleration readings from an accelerometer), it may be determined that the user device 102 is being rested on a user's leg during reading.

The processing device 1030 may include sensor circuitry 1035 (e.g., sensor device drivers) that enables the processor(s) 1030 to interpret signals received from the optical sensor(s) 1066 and/or additional sensors 1068. In one embodiment, the optical sensors 1066 and/or additional sensors 1068 output raw sensor data. In another embodiment, the optical sensors 1066 and/or additional sensors 1068 output fully processed signals to the processor(s) 1030. For example, the additional sensors 1068 may output a user contact/no user contact signal using a single line interface or a multi-line interface. In another embodiment, the additional sensors 1068 output, for example, positional data and/or object presence data (e.g., of a human body part) to the processing device 1030 without first processing the data. In either instance, the processing device 1030 may use the sensor circuitry 1035 to process and/or interpret the received data. If data is received from multiple sensors, processing the data may include averaging the data, identifying a maximum from the data, or otherwise combining the data from the multiple sensors.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting a purchase of an application by a user of a user device from a content providing system;
   storing application file chunks corresponding to the application on a remote storage device, wherein the user device is connected to the remote storage device over a network;
   determining that the application file chunks are to be cached in internal flash storage of the user device prior to being executed by a processing device on the user device based at least in part on at least one performance capability of the remote storage device failing to satisfy at least one resource demand of the application;
   predicting that a request to execute the application on the user device will be received from the user;
   requesting the application file chunks from the remote storage device prior to the request being received, wherein the application file chunks are requested in an order in which the application file chunks will be utilized during execution of the application;
   storing the application file chunks in the internal flash storage of the user device; and
   executing, by the processing device on the user device, the application using the application file chunks stored in the internal flash storage.

2. The method of claim 1, wherein determining that the application file chunks are to be cached in the internal flash storage comprises determining that a processing rate at which the remote storage device is able to process requests for the application file chunks fails to satisfy an issuing rate at which the application is able to issue requests for the application file chunks.

3. The method of claim 1, wherein predicting that the request to execute the application comprises determining at least one of:
   the application having been recently used by the user of the user device,
   the application having been recently purchased by the user of the user device, or
   the application being currently displayed in an application launcher of the user device has occurred.

4. The method of claim 1, wherein requesting the application file chunks from the remote storage device comprises determining that a dynamic execution path associated with the application is available, the dynamic execution path to define the order in which the application file chunks will be utilized during execution of the application, wherein the dynamic execution path is included in application metadata received from the content providing system with the application, if available.

5. The method of claim 4, further comprising:
   maintaining a data structure to store an indication of which application file chunks have been received from the remote storage device and confidence levels for application file chunks that have not been received from the remote storage, the confidence levels to indicate a likelihood that a corresponding application file chunk will be utilized during execution of the application, wherein the confidence levels are determined in view of the dynamic execution path and a current point of execution of the application.

6. A user device comprising:
a memory to store a virtual installation module; and
a processing device operatively coupled to the memory, the processing device to execute the virtual installation module to:
determine that at least one application file chunk is to be stored in the memory of the user device prior to being executed, wherein the application file chunk includes a subset of data of an application and is stored on a remote storage device that corresponds to the application to be executed by the processing device;
determine when a request to execute the application on the user device will be received; and
store the at least one application file chunk from the remote storage device in the memory of the user device based at least in part on performance capabilities of the remote storage device failing to satisfy resource demands of the application and based at least in part on when the at least one application file chunk will be utilized during execution of the application.

7. The user device of claim 6, wherein to determine that the at least one application file chunk is to be stored in the memory, the virtual installation module to:
determine the resource demands of the application; and
determine the performance capabilities of the remote storage device.

8. The user device of claim 7, wherein the virtual installation module further to:
periodically monitor the resource demands of the application and the performance capabilities of the remote storage device during execution of the application.

9. The user device of claim 6, wherein the virtual installation module to determine that a request to execute the application on the user device will be received when it is determined that at least one of the application has been recently used by a user of the user device, the application has been recently acquired by the user or the application is currently displayed in an application launcher of the user device.

10. The user device of claim 6, wherein to store the at least one application file chunk from the remote storage device in the memory of the user device, the virtual installation module to determine that a dynamic execution path associated with the application is available, the dynamic execution path to define when the at least one application file chunk will likely be utilized during execution of the application.

11. The user device of claim 10, wherein the virtual installation module to load the at least one application file chunk from the remote storage according to the dynamic execution path and a current point of execution of the application.

12. A method comprising:
determining, by a processing device, that at least one application file chunk stored on a remote storage device is to be stored in a memory of a user device prior to being executed, wherein the at least one application file chunk includes a subset of data of an application and is stored on a remote storage device;
calculating when a request to execute the application on the user device will be received; and
storing the at least one application file chunk from the remote storage device in the memory of the user device according to an execution path associated with the application based at least in part on performance capabilities of the remote storage device failing to satisfy resource demands of the application.

13. The method of claim 12, wherein determining that the at least one application file chunk is to be stored in the memory comprises:
determining the resource demands of the application; and
determining the performance capabilities of the remote storage device.

14. The method of claim 13, further comprising:
periodically monitoring the resource demands of the application and the performance capabilities of the remote storage device during execution of the application.

15. The method of claim 13, wherein the performance capabilities comprise a processing rate at which the remote storage device can process requests for the at least one application file chunk and the resource demands comprise an issuing rate at which the application can issue requests for the at least one application file chunk.

16. The method of claim 12, wherein calculating when the request to execute the application on the user device will be received comprises determining that at least one of the application has been recently used by a user of the user device, the application has been recently acquired by the user, or the application is currently displayed in an application launcher of the user device.

17. The method of claim 12, wherein the execution path is a dynamic execution path to define when the at least one application file chunk will be utilized during execution of the application.

18. The method of claim 12, further comprising:
determining that a plurality of application file chunks stored on the remote storage device are to be stored in the memory of the user device prior to being executed; and
storing the plurality of application file chunks in the memory of the user device according to the execution path associated with the application, wherein the execution path defines a confidence level for an order in which the plurality of application file chunks will be utilized during execution of the application.

* * * * *